United States Patent
Battles et al.

(10) Patent No.: US 7,668,454 B2
(45) Date of Patent: Feb. 23, 2010

(54) PHOTOGRAPHY ADVICE BASED ON CAPTURED IMAGE ATTRIBUTES AND CAMERA SETTINGS

(75) Inventors: Amy E. Battles, Fort Collins, CO (US); Sarah J. Schwartz, Fort Collins, CO (US); Ben Fineman, San Francisco, CA (US); Geoffrey Dowd, San Francisco, CA (US); Cordell Ratzlaff, Palo Alto, CA (US); Karen E. Williams, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 11/512,494

(22) Filed: Aug. 29, 2006

(65) Prior Publication Data

US 2008/0056706 A1    Mar. 6, 2008

(51) Int. Cl.
G03B 7/02     (2006.01)
H04N 5/222    (2006.01)

(52) U.S. Cl. .................................. 396/281; 348/333.02

(58) Field of Classification Search ............ 396/49, 396/68, 70, 213, 281, 294, 295, 287; 348/333.01–333.03, 348/333.11
See application file for complete search history.

(56) References Cited

U.S. PATENT DOCUMENTS

| | | | |
|---|---|---|---|
| 6,839,513 B1 | 1/2005 | Battles | |
| 6,930,718 B2 * | 8/2005 | Parulski et al. | 348/333.11 |
| 7,317,485 B1 * | 1/2008 | Miyake et al. | 348/333.02 |
| 7,397,500 B2 * | 7/2008 | Yost et al. | 348/208.99 |
| 2003/0026607 A1 * | 2/2003 | Okisu et al. | 396/213 |
| 2003/0107771 A1 * | 6/2003 | Shibata | 358/3.28 |
| 2003/0231241 A1 | 12/2003 | Iida | |
| 2004/0091234 A1 | 5/2004 | Delorme et al. | |
| 2004/0252217 A1 | 12/2004 | Battles et al. | |
| 2005/0030388 A1 | 2/2005 | Stavely et al. | |
| 2005/0212955 A1 | 9/2005 | Craig et al. | |
| 2006/0104483 A1 * | 5/2006 | Harel et al. | 382/115 |

FOREIGN PATENT DOCUMENTS

| | | |
|---|---|---|
| JP | 6337467 | 12/1994 |
| JP | 2000333045 | 11/2000 |
| JP | 2003008977 | 1/2003 |
| JP | 2003219218 | 7/2003 |
| JP | 2004048699 | 2/2004 |
| JP | 2004078207 | 3/2004 |
| JP | 2004080205 | 3/2004 |
| JP | 2004112054 | 4/2004 |
| JP | 2005236702 | 9/2005 |

OTHER PUBLICATIONS

JP-2004-112054 Machine Translation (JPO website).*
Robert G. Gann, Ph.D; R707; 3 pages;; Jan. 2004 Hewlett-Packard Development Company, L.P.

* cited by examiner

Primary Examiner—W. B. Perkey
Assistant Examiner—Minh Q Phan

(57) ABSTRACT

A method for providing photography advice, such as in the use of a camera, is provided. The method includes storing image attributes associated with a plurality of images captured by the camera. Camera settings associated with the captured images are also stored. At least one of a plurality of photography pointers is provided based on the stored image attributes and the stored camera settings.

20 Claims, 4 Drawing Sheets

PHOTOGRAPHY ADVICE BASED ON CAPTURED IMAGE ATTRIBUTES AND CAMERA SETTINGS

BACKGROUND

After years of continual improvement and refinement, digital cameras now provide an attractive alternative to photographic film cameras, due to their affordability, ease of use, enhanced resolution, large image storage capability, and other factors. Nevertheless, due to increasing competition between digital camera manufacturers, the process of improving upon current digital camera offerings continues unabated. Any potential advantage provided by a particular digital camera over the competition for the benefit of the customer can mean augmented sales, and hence additional revenue, for the manufacturer.

Given the processing capacity typically provided in a digital camera, a plethora of modes and options for capturing an image may be provided to the user of the camera. For example, the user may decide whether to use a flash or strobe of the camera, depending on the current light level. The user may employ an optical and/or digital zoom feature to compose an image according to personal taste. Other features, such as manually setting the light sensitivity, shutter speed, and focus of the camera, allow the user more control over how an image is captured. Optionally, the camera may automatically adjust such camera settings according to the current light level and other environmental conditions. Further, the camera may provide several programs or modes, such as portrait mode, sports action mode, landscape mode, and others to allow a user to tailor the operation of the camera to specific imaging tasks in a quick and simple fashion.

However, the ability of a user to employ any of these features is often related to the relative photographic experience of the user in general, and to the user's experience with the camera in particular. More specifically, some of the camera functions and options available to a novice may remain unused, or even misused, often resulting in undesirable images being captured. In addition, as the number of features increases, the more likely an inexperienced user will become confused attempting to use them. On the other hand, more experienced users may benefit from use of the various functions provided, assuming that they know such functions are available. Unfortunately, knowledge of such availability may be lacking if the user has not perused the user manual, or has not thoroughly navigated the menu options supplied by the camera.

DETAILED DESCRIPTION

Figure 1:
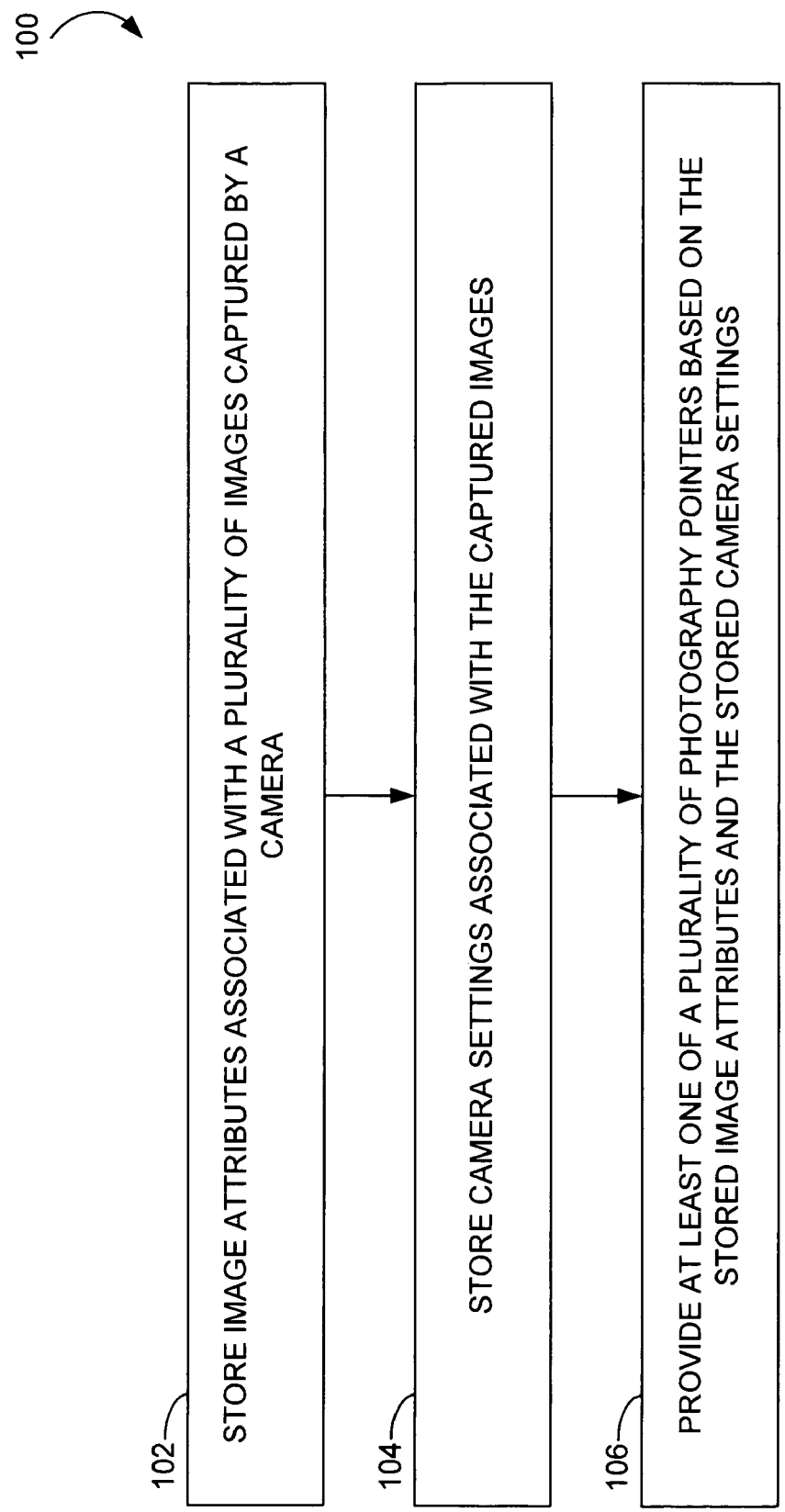
FIG. 1 is a simplified flow diagram of a method of providing photography advice according to an embodiment of the invention.

One embodiment of the invention, a method 100 for providing photography advice, is depicted in the flow diagram of FIG. 1. Image attributes associated with a plurality of images captured by a camera are stored (operation 102). In one example, an image attribute is a visual characteristic that can be associated with any image, such as the overall exposure level of the image, the focus displayed by the image, the overall composition of the image, and other image characteristics.

Also stored are camera settings associated with the captured images (operation 104). In one embodiment, a camera setting is any modifiable function or configuration of the camera that may impact the attributes of an image. Examples of camera settings include, but are not limited to, an exposure setting, a light sensitivity setting, a shutter speed setting, a focus setting, a zoom setting, a strobe setting, a white balance setting, a program or mode setting, an exposure metering setting, a saturation setting, a sharpness setting, a contrast setting, a date imprint setting, a resolution setting, a compression setting, and an auto focus area setting.

Based on the stored image attributes and the stored camera settings, at least one of a plurality of photography "pointers," or items of photography advice, is provided (operation 106). For example, a pointer may indicate one or more configurable settings adjusted by the user that appear to cause poor quality in an image. In other situations, the pointer may identify various settings or modes available to, but not yet employed by, the user. Any other form of photography advice compatible with the camera may be provided as well.

Figure 2:
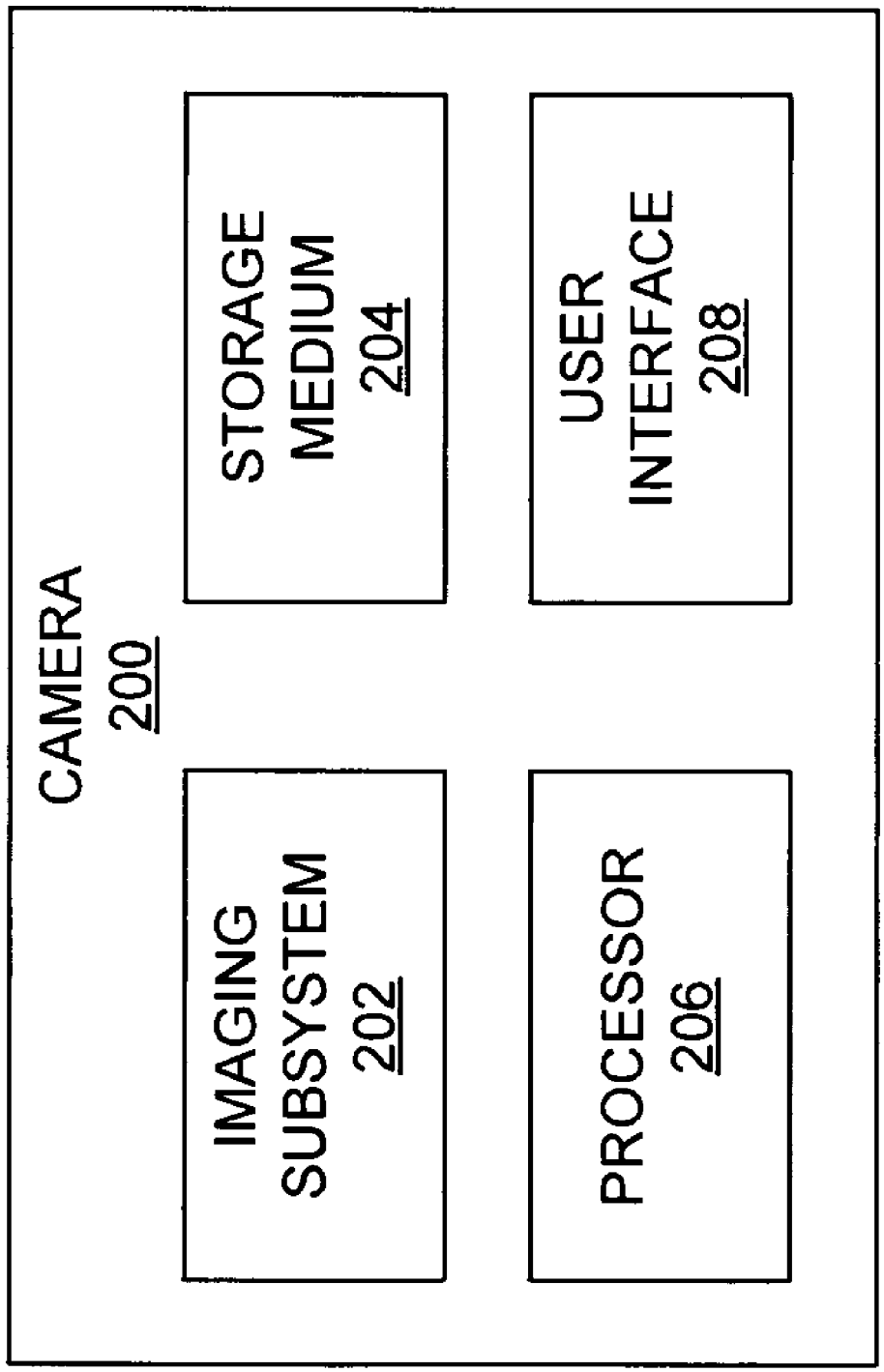
FIG. 2 is a simplified block diagram of a camera capable of providing photography advice according to an embodiment of the invention.

Another embodiment of the invention, a camera 200, such as a digital camera, is illustrated in the simplified block diagram of FIG. 2. The camera 200 includes an imaging subsystem 202, a storage medium 204, a processor 206, and a user interface 208. Other components, subsystems, and the like may also be incorporated in the camera 200, but are not shown in FIG. 2 for the purposes of brevity and clarity.

Generally, the imaging subsystem 202 is configured to capture images. In one example, the imaging subsystem includes a lens optically coupled with a photosensitive array, such as a charge-coupled device (CCD) array, for capturing images by way of light passing through the lens and impacting the CCD array. In other embodiments, alternative imaging subsystems employing other optical technologies for capturing images may be utilized.

The storage medium 204 is configured to store image attributes and camera settings associated with a plurality of images captured by the imaging subsystem 202. The storage medium 204 can take any of a number of nonvolatile forms, including on-board or captive nonvolatile digital memory, and removable nonvolatile digital memory, such as a Secure Digital (SD) card.

The processor 206 is configured to select at least one of a plurality of photography pointers based on the stored image attributes and the stored camera settings within the storage medium 204. In one implementation, the processor 206 may be any microprocessor, microcontroller, or other algorithmic processor capable of executing a series of instructions to perform its designated tasks. Further, the process 206 may also perform other functions within the camera 200 not specifically described herein, such as control of the imaging subsystem 202.

The user interface 208 is configured to provide to a user the photography pointer selected by the processor 206. The user interface 208 may provide the photography pointer to a user in any fashion, including visually or by audio.

Figure 3:
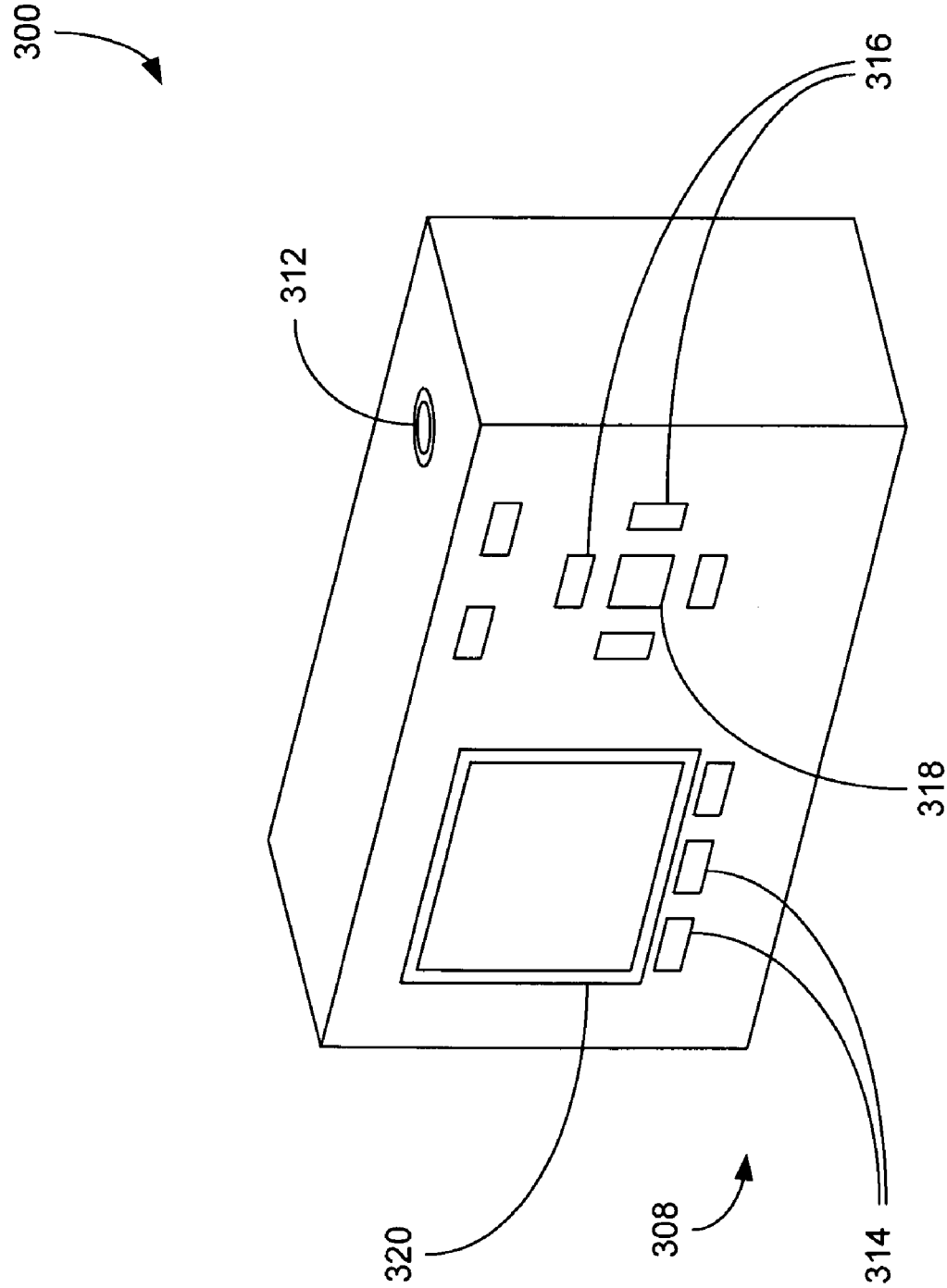
FIG. 3 is a perspective view of a camera capable of providing photography advice according to another embodiment of the invention.

In another embodiment of the invention, a digital camera 300, shown in perspective view in FIG. 3, provides a user interface 308 containing a number of input and output mechanisms for interfacing a user with the camera 300. Also included, but not specifically shown in FIG. 3, is the imaging subsystem 202, the storage medium 204, and the processor 206 of FIG. 2. The user interface 308 includes a shutter button 312 which allows the user to capture an image by way of the imaging subsystem 202 onto a storage medium 204.

A set of mode buttons 314 allow the user to place the camera 300 into any of a number of programs or modes controlling the operation of the camera 300. For example, the camera 300 may be switched between viewing the current field of view of the imaging subsystem 202 and reviewing previously captured images.

The mode buttons 314 may also allow the user to enter a menu system for adjusting various settings and other aspects of the camera 300. In addition, a set of directional buttons 316 may allow the user to navigate the various menus included, adjust a multitude of camera settings provided, and perform other functions. Further, a selection button 318 provides a way to, for example, select a particular menu item, or set the value of a particular camera setting. Additional buttons, dials, and other mechanisms for accepting user input may be provided in other embodiments.

Output to the user may be provided by way of a visual display 320, such as a liquid crystal display (LCD). The display 320 provides a means for the user to view a prospective image within the field of view of the imaging subsystem 202 before image capture, to examine previously captured images stored within the camera 300, and to peruse the various camera settings, menus, options, and other aspects of the camera 300.

Figure 4:
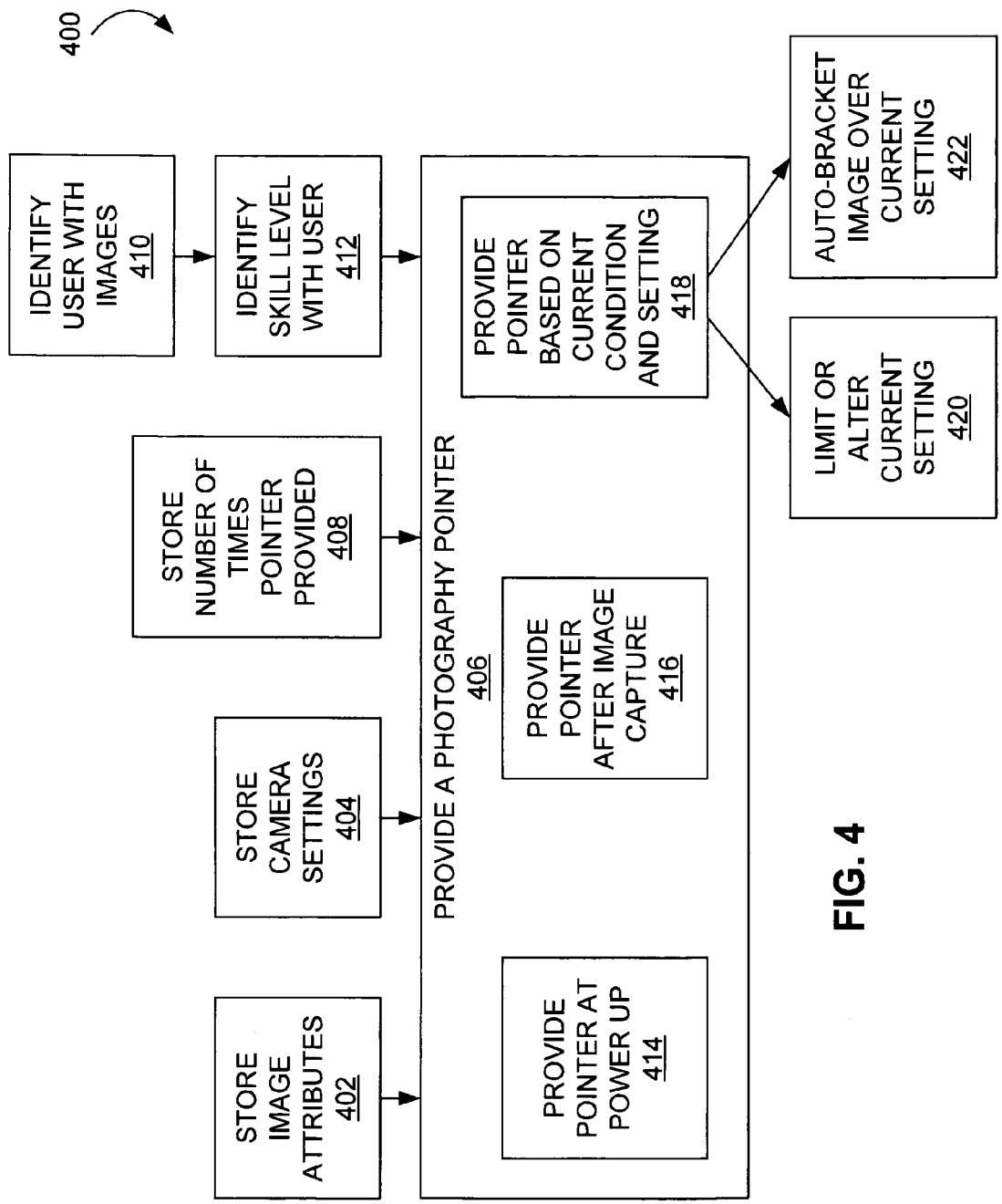
FIG. 4 is a flow diagram of a method for providing photography advice according to another embodiment of the invention.

Employed by the digital camera 300 is a method 400, depicted by way of a block diagram in FIG. 4, for providing photography advice to a user of the camera 300. While the method 400 is described specifically in conjunction with the camera 300, other cameras with varying designs may utilize the method 400, and variants thereof, in other embodiments.

Each image captured within the camera 300 is associated with image attributes, which are stored within the storage medium 204 of the camera 300 (operation 402). The attributes may be stored in any of a number of forms. As indicated above, the image attributes may include, for example, image exposure, image focus, image composition, and other image characteristics. For example, the exposure level of an image may be determined by way of an average of the luminance level of each picture element (pixel) of the image. Similarly, the focus level may be yielded by determining the number or location of areas appearing in focus. Regarding composition level, an analysis of an image may determine whether the apparent subject of the image is centered within the field of view, resides at a location within the field of view according to the "one-third rule," or some other metric. Other image characteristics may be determined from each image according to measurement criteria applicable to the specific attribute.

Each image attribute may be denoted by way of a numeric value indicating the level or state of the attribute. In another embodiment, each attribute may reflect a general category pertaining to a specific characteristic of the corresponding image. For example, each image may be classified as "overexposed," "underexposed," or "properly exposed," according to some criteria related to the exposure level of the image. Similarly, the overall focus of an image may be designated as "out of focus" or "in focus." With respect to composition, the image may be "properly composed" or "improperly composed," for example.

In addition to image attributes, each image captured by the camera 300 is associated with camera settings employed to configure the camera 300 prior to capturing the image. The camera settings are stored within the camera 300 in any of several ways (operation 404). The camera settings include, for example, whether a flash or strobe is used, the setting of the optical or digital zoom, the light sensitivity setting of the CCD array, the shutter speed, and others. In addition, the setting may include special programs or modes in which the camera may be operated in accordance with the nature of the scene to be captured. Such modes may include action or sports mode, landscape mode, portrait mode, and the like.

In one embodiment, one or more image attributes, and one or more camera settings, may be stored for each image currently residing within the camera 300. Further, image attributes and camera settings may also be stored for images previously captured by the camera 300, but not currently stored therein. In another implementation, a running count or overall percentage of captured images falling within a particular image attribute category may be maintained. For example, the camera 300 may store the number or percentage of images overexposed, underexposed, or properly exposed. Similarly, the number or percentage of images in or out of focus may be retained. Also, indications for camera settings, such as the number or percentage of images captured with the flash off, the digital zoom on, or with a particular program or mode, may be similarly stored. Allowing a running count or percentage of these metrics would likely result in less space within the storage medium 204 being consumed within the camera 300. In addition, a total number of images captured may also be maintained to provide an indication as to the amount of experience the user has accumulated with the camera 300.

In one embodiment, the storage medium 204 is distinguished from a separate, removable storage medium for storing captured images. As a result, image storage media may be swapped in and out of the camera 300 without adversely affecting the storage of the image attributes and camera settings.

The stored image attributes and camera settings are employed to provide at least one photography pointer to the user of the camera (operation 406). The photography pointer generally provides some advice relevant to a photographic situation as indicated by the stored attributes and settings. Descriptions of how such image advice may be generated for a single image are presented, for example, in U.S. Patent Application Publication No. 2005/0030388, published Feb. 10, 2005, entitled "System and Method for Improving Image Capture Ability;" U.S. Patent Application Publication No. 2004/0252217, published Dec. 16, 2004, entitled "System and Method for Analyzing a Digital Image;" and U.S. Patent Application Publication No. 2005/0212955, entitled "System and Method for Analyzing a Digital Image;" each of which is hereby incorporated by reference herein in its entirety.

In particular situations in which captured images appear to be underexposed or blurred, and the camera strobe or flash has been disabled, the photography pointer may indicate to the user that the use of a flash or a tripod may ameliorate the blurriness or underexposure experienced with previous images. Such information may be appropriate for a novice camera user.

However, if many images have been taken which are identified with these same attributes and settings, the nature of the photography pointer may be altered to assume a higher level of familiarity with the camera 300. Using the same example described above, the photography pointer may indicate that the use of a higher light sensitivity setting for the imaging subsystem may help reduce the blurriness and underexposure associated with previously captured images. Thus, the use of image attributes and camera settings over a number of images may aid the camera 300 in presenting photography pointers that are tailored to the user's familiarity with the camera 300, as well as the user's overall experience with photography in general.

In one implementation, the pointer provided to the user may include a reminder or disclaimer denoting a particular camera setting as the cause of the undesirable image attribute. For example, in the situation described above regarding a recommendation for a higher light sensitivity setting when the flash is disabled, the pointer could indicate within the pointer the fact that the flash is disabled. Such additional text may thus remind the user of this fact in the event that the user did not intend to disable the flash.

Moreover, the number of times a particular photography pointer has been provided to a user may also be stored (operation 408), which may be utilized as a basis for the provided photography pointer. For example, if a particular pointer has been provided to the user many times, the camera 300 may provide a pointer which assumes more experience or familiarity with the camera 300 than what had been previously presented. In another instance, the photography pointer being provided may be a more abbreviated version of the same advice previously given.

Given that more than one user may be using the same camera 300, the stored image attributes and camera settings may correspond with a particular set of captured images associated with a particular user (operation 410) in one embodiment. Thus, the images associated with the stored attributes and settings may be a subset of all images captured by way of the camera 300. In one example, the user may associate himself or herself with certain captured images by way of selecting a menu item accessible by the user interface 308 indicating the identity of the user. This identification may occur before or after the images are captured. Allowing such identification may allow the camera 300 to more finely target any generated photography advice to the user.

Further toward this end, the camera 300 may specifically identify a skill level with a user (operation 412). In one example, the camera 300 may associate the skill level with the user based on the previously stored attributes and settings of previous images. For example, the camera settings of previous images, as well as the frequency with which the user has been provided with photography pointers in the past, may be used to determine that experience level.

In another embodiment, the user may be able to directly inform the camera 300 of the experience level as perceived by the user. The user interface 308, possibly by way of a menu selection item, may allow the user to choose one of a number of general photography experience levels, such as novice, intermediate and advanced. Additionally or in the alternative, the menu system may allow the user to indicate his level of familiarity with the particular camera 300. For example, a user with a high level of experience in photography in general, but who is not familiar at all with this specific camera 300, may wish to receive photography pointers regarding the advanced features of the camera, unlike a true novice user, which may initially operate the camera using its more automated features. By allowing the user or the camera 300 to determine skill level, the photography pointers and other functions described herein may be based on the experience or familiarity level of the user with the camera 300.

In one embodiment, the display 320 of the camera 300 may be utilized to provide the photography pointer to the user by way of text, graphics, or both. In another example, the pointer may be embodied as an audio message or tone played by the camera 300 via a speaker (not shown in FIG. 3).

The circumstances or timing under which a photography pointer is provided to the user may depend on the particular circumstances at any one time. For example, photography pointers may be supplied in response to the user powering up the camera 300 (operation 414). In one implementation, the pointer may be selected from a number of pointers based upon the stored image attributes and camera settings. Further, the camera 300 may present a different pointer commensurate with the stored attributes and settings each time the camera 300 is turned on.

In another embodiment, the photography pointer may be provided after an image has been captured (operation 416). In that case, the camera 300 bases any advice given on the attributes and settings of the image, along with the previously stored information associated with older images. This particular timing for the pointer would allow the user to decide whether to retain the most recent image, or recapture the image by adhering to one or more of the pointers provided by the camera 300.

In another example, a photography pointer may be presented to the user prior to the capture of an image. Under that scenario, the camera 300 identifies a current environmental condition and a current camera setting of the camera 300. The camera 300 provides a photography pointer based on the current environmental condition and the current camera setting, in addition to the stored image attributes and camera settings associated with previously captured images (operation 418).

In one embodiment, the environmental condition may be any physical condition relating to the camera 300, or to a subject or scene of an image to be captured. The current light level as detected by the imaging subsystem of the camera 300 may be one possible environmental condition. Another may be a distance between the camera 300 and the subject, which may determine the focus adjustment of the imaging subsystem. Yet another possible condition is detected movement of the subject relative to the camera 300. Other environmental conditions may be detected in other embodiments.

Also, the current camera setting used to generate a photography pointer may be any camera setting discussed above, including, but not limited to, an exposure setting, a light sensitivity setting, a shutter speed setting, a focus setting, a zoom setting, a strobe setting, a white balance setting, a program or mode setting, an exposure metering setting, a saturation setting, a sharpness setting, a contrast setting, a date imprint setting, a resolution setting, a compression setting, and an auto focus area setting.

Generally, the current environmental conditions and current camera settings are detected when the user is in the process of orienting the camera 300 to capture an image. In one embodiment, the user may use a portion of the user interface 308 to indicate when a photography pointer should be enabled based on the current environmental condition and the current setting. In one implementation, providing a photography pointer based on the current conditions and settings may be initiated by way of the user partially depressing the shutter button 312 of the camera 300. Ordinarily, depressing the shutter button 312 in this manner also causes the imaging subsystem 202 of the camera 300 to attempt to focus on a subject within the field of view of the imaging subsystem 202.

Under these circumstances, the actual operation of the camera 300 may also be controlled when the user causes the camera 300 to capture the image, such as when the shutter button 312 is fully depressed. In one embodiment, one of the current camera settings may be altered or limited to aid the user in producing a worthwhile image (operation 420). For example, if the user attempts to capture an action scene involving one or more rapidly moving subjects while the camera 300 is placed in landscape mode, the processor 206 may place the camera 300 in action mode prior to capturing the image. In another instance, the processor 206 may enable the flash if the user has intentionally disabled the flash and a subsequent captured image will not yield a discernible scene.

In one implementation, the processor 206 of the camera 300 may determine whether controlling the camera settings in such a manner is warranted depending on whether the previously stored image attributes and camera settings indicate that the user is a relative photography novice. Oppositely, if the stored attributes and settings indicate a rather experienced user, limiting the camera settings may be undesirable.

Furthermore, if one or more camera settings are limited or altered in the fashion described above, the camera 300 may indicate that fact either before or after the image is captured to warn the user. In one example, a textual or graphical message on the display 320 relays this information to the user. An audible sound may also be provided under these circumstances.

Instead of specifically altering or limiting the camera setting for an impending image capture, the camera 300 may instead "auto-bracket" the image by capturing several images over a range of one or more camera settings (operation 422). More specifically, several images of the same scene may be captured using a variety of shutter speeds, light sensitivity levels, flash levels, and the like, thus supplying the user a variety of images of the same subject or scene from which to choose. In one example, the camera 300 may be configured to perform such auto-bracketing in the event the current environmental conditions are challenging, such as poor lighting and quickly moving subjects.

Also, the stored image attributes and camera settings may indicate when auto-bracketing is warranted. In one situation, if a relatively inexperienced user has not altered a particular camera setting, auto-bracketing over that particular setting may help show the user the benefits of modifying that setting in the current photographic context. For example, if the user has not previously altered the light sensitivity level of the camera 300, but has proven to be adept with other camera settings, as shown in the stored information associated with previously captured images, auto-bracketing by altering the light sensitivity level may exemplify the usefulness of that particular setting.

Informing the user of the auto-bracketing, either before or after the images are to be captured, may be performed in one embodiment, such as by way of a textual or graphical message on the display 320, an audible tone or other sound, or by other methods employable by the user interface 308 of the camera 300. In addition, as with the limiting or altering of the camera mode setting, the auto-bracketing feature may be enabled or disabled at the option of the user, possibly by way of a menu item selection via the directional buttons 316 and the selection button 318 of the user interface 308.

In one embodiment, the camera 300 may provide the photography pointers under any or all of the particular situations described above. Moreover, depending on experience level, the user may wish to enable or disable such functionality in the camera. To this end, the times at which the photography pointers are offered may also be selected by the user by way of a menu item selection of the camera 300.

Various embodiments described herein provide a means for a camera, such as a digital camera, to provide photography advice that is appropriate for the particular user operating the camera. Without some indication of the relative skill level of the user, or the familiarity of the user with the camera, any advice provided by the camera may be inappropriate for the particular user. Advice targeted to inexperienced photographers is useless, and possibly annoying, for more advanced users, while highly technical advice for those well-versed in photography will not serve the purposes of the beginner. Given the appeal of newer cameras to both advanced and novice photographers, the ability to tailor advice or pointers to the skill level of the user, as provided herein, is beneficial to the user in terms of a more satisfying imaging experience. Also, camera manufacturers may benefit in terms of a broader potential market due to wider appeal of a camera employing the concepts described herein to photographers of all skill levels.

Each embodiment of the invention may be realized by way of software or firmware instructions residing on a storage medium located within the camera 300. These instructions may be executable on the processor 206 of the camera, such as a microcontroller, microprocessor, or other device capable of executing the instructions. Electronic or electromechanical hardware, such as integrated circuits, sensors, motors, and the like may also be employed in conjunction with the processor 206 to perform the various methods described herein.

While several embodiments of the invention have been discussed herein, other embodiments encompassed by the scope of the invention are possible. For example, while some embodiments of the invention are specifically described above in conjunction with digital cameras, other types of cameras, such as ordinary photographic film cameras and digital video cameras, may also benefit from application or adaptation of the various embodiments, as presented above. Further, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method for providing photography advice, comprising:

storing image attributes associated with a plurality of images captured by a camera, resulting in stored image attributes;

storing camera settings associated with the captured images, resulting in stored camera settings;

providing at least one of a plurality of photography pointers based on the stored image attributes and the stored camera settings; and storing a number of times each of the plurality of photography pointers has been provided previously;

wherein the at least one of the plurality of photography pointers is also based on the number of times each of the plurality of photography pointers has been provided previously;

identifying a current environmental condition other than camera stability;

identifying a current camera setting;

wherein the at least one of the plurality of photography pointers is also based on the current environmental condition and the current camera setting;

identifying a range of the current camera setting based on the stored image attributes, the stored camera settings, and the current environmental condition; and capturing a plurality of new images corresponding to the range of the current camera setting.

2. The method of claim 1, further comprising:

identifying a user with the captured images;

wherein the captured images are a subset of all images captured on the camera.

3. The method of claim 1, further comprising:
identifying a skill level with a user of the camera;
wherein the at least one of the plurality of photography pointers is also based on the skill level of the user.

4. The method of claim 1, wherein the at least one of the plurality of photography pointers is provided after an image is captured.

5. The method of claim 1, wherein the at least one of the plurality of photography pointers is provided after the camera is powered up.

6. The method of claim 1, further comprising:
altering or limiting the current camera setting based on the stored image attributes, the stored camera settings, and the current environmental condition other than camera stability; and
capturing a new image employing the altered or limited current camera setting.

7. A storage medium comprising instructions executable on a processor for employing the method of claim 1.

8. A camera, comprising:
means for capturing images;
means for storing image attributes and camera settings associated with a plurality of images captured by the capturing means, resulting in stored image attributes and stored camera settings;
means for providing at least one of a plurality of photography pointers based on the stored image attributes and the stored camera settings; and
means for storing a number of times each of the plurality of photography pointers has been provided previously;
wherein the at least one of the plurality of photography pointers is also based on the number of times each of the plurality of photography pointers has been provided previously;
means for identifying a range of the current camera setting for the new image based on the stored image attributes, the stored camera settings, and the current environmental condition other than camera stability; and
wherein the capturing means is configured to capture a plurality of new images corresponding to the range of the current camera setting.

9. The camera of claim 8, further comprising:
means for identifying a user with the captured images;
wherein the captured images are a subset of all images captured by the capturing means.

10. The camera of claim 8, further comprising:
means for identifying a skill level with a user of the camera;
wherein the at least one of the plurality of photography pointers is also based on the skill level of the user.

11. The camera of claim 8, further comprising:
means for identifying a current environmental condition other than camera stability; and
means for identifying a current camera setting;
wherein the at least one of the plurality of photography pointers is also based on the current environmental condition other than camera stability and the current camera setting.

12. The camera of claim 11, further comprising:
means for altering or limiting the current camera setting for the new image based on the stored image attributes, the stored camera settings, and the current environmental condition other than camera stability; and
wherein the capturing means is configured to capture a new image employing the altered or limited current camera setting.

13. A camera, comprising:
an imaging subsystem configured to capture images;
a storage medium configured to store image attributes and camera settings associated with a plurality of the images captured by the imaging subsystem, resulting in stored image attributes and stored camera settings;
a processor configured to select at least one of a plurality of photography pointers based on the stored image attributes and the stored camera settings; and
a user interface configured to provide the at least one of the plurality of photography pointers to a user;
wherein the storage medium is further configured to store a number of times each of the plurality of photography pointers has been provided previously; and
wherein the at least one of the plurality of photography pointers is also based on the number of times each of the plurality of photography pointers has been provided previously.

14. The camera of claim 13, wherein:
the user interface is also configured to identify the user with the captured images; and
the captured images are a subset of all images captured by the imaging subsystem.

15. The camera of claim 13, wherein:
the processor is further configured to identify a skill level with a user of the camera; and
the at least one of the plurality of photography pointers is also based on the skill level of the user.

16. The camera of claim 13, wherein the processor is further configured so that the at least one of the plurality of photography pointers is provided via the user interface after an image is captured.

17. The camera of claim 13, wherein the processor is further configured so that the at least one of the plurality of photography pointers is provided via the user interface after the camera is powered up.

18. The camera of claim 13, wherein:
the processor is further configured to identify a current environmental condition other than camera stability and a current camera setting; and
the at least one of the plurality of photography pointers is also based on the current environmental condition other than camera stability and the current camera setting.

19. The camera of claim 18, wherein:
the processor is further configured to alter or limit the current camera setting based on the stored image attributes, the stored camera settings, and the current environmental condition other than camera stability; and
the processor is further configured to cause the imaging subsystem to capture a new image employing the altered or limited current camera setting.

20. The camera of claim 18, wherein:
the processor is further configured to identify a range of the current camera setting based on the stored image attributes, the stored camera settings, and the current environmental condition other than camera stability; and
the processor is further configured to cause the imaging subsystem to capture a plurality of new images corresponding to the range of the current camera setting.

* * * * *

UNITED STATES PATENT AND TRADEMARK OFFICE
CERTIFICATE OF CORRECTION

PATENT NO. : 7,668,454 B2  Page 1 of 1
APPLICATION NO. : 11/512494
DATED : February 23, 2010
INVENTOR(S) : Amy E. Battles et al.

It is certified that error appears in the above-identified patent and that said Letters Patent is hereby corrected as shown below:

In column 10, line 12, in Claim 13, after "settings;" delete "and".

Signed and Sealed this

Sixth Day of July, 2010

David J. Kappos
*Director of the United States Patent and Trademark Office*